United States Patent
Yucra Rodriguez et al.

(10) Patent No.: US 12,026,249 B2
(45) Date of Patent: Jul. 2, 2024

(54) METHODS, MEDIA, AND SYSTEMS FOR SCREENING MALICIOUS CONTENT FROM A WEB BROWSER

(71) Applicant: Capital One Services, LLC, McLean, VA (US)

(72) Inventors: Jonatan Yucra Rodriguez, San Francisco, CA (US); Andrew Veenstra, San Francisco, CA (US); Vu Nguyen, Pittsburg, CA (US); Jose Moreno, Berkeley, CA (US)

(73) Assignee: Capital One Services, LLC, McLean, VA (US)

( * ) Notice: Subject to any disclaimer, the term of this patent is extended or adjusted under 35 U.S.C. 154(b) by 562 days.

(21) Appl. No.: 17/179,646

(22) Filed: Feb. 19, 2021

(65) Prior Publication Data
US 2022/0269774 A1    Aug. 25, 2022

(51) Int. Cl.
  *G06F 21/53*    (2013.01)
(52) U.S. Cl.
  CPC ........ *G06F 21/53* (2013.01); *G06F 2221/033* (2013.01); *G06F 2221/2119* (2013.01)
(58) Field of Classification Search
  CPC ..... G06F 21/53; G06F 21/566; H04L 63/1483
  See application file for complete search history.

(56) References Cited

U.S. PATENT DOCUMENTS

| | | | |
|---|---|---|---|
| 9,787,714 B2 | 10/2017 | Bach | |
| 10,747,881 B1 | 8/2020 | Luo et al. | |
| 10,880,322 B1* | 12/2020 | Jakobsson | H04L 51/08 |
| 2006/0101334 A1* | 5/2006 | Liao | H04L 51/18 |
| | | | 715/205 |
| 2009/0077383 A1* | 3/2009 | de Monseignat | H04L 9/3242 |
| | | | 713/176 |
| 2011/0283363 A1* | 11/2011 | Verschoor | H04L 12/2818 |
| | | | 726/26 |
| 2020/0137110 A1 | 4/2020 | Tyler et al. | |
| 2020/0204572 A1* | 6/2020 | Jeyakumar | H04L 63/123 |
| 2020/0252428 A1 | 8/2020 | Gardezi et al. | |
| 2021/0021612 A1* | 1/2021 | Higbee | H04L 63/1491 |

OTHER PUBLICATIONS

Chou et al., Client-Side Defense against Web-Based Identity Theft, 2004.*
Feng et al., A Detection Method for Phishing Web Page Using DOM-Based Doc2Vec Model, Mar. 2020.*
Zhang et a., CANTINA: A Content-Based Approach to Detecting Phishing Web Sites, ACM, 2007.*
Benefits of using Webmail vs Email Client, Exabytes Network, 2014.*
Element of Client-Side Scripting, informIT, 2001.*

* cited by examiner

*Primary Examiner* — Minh Dinh
(74) *Attorney, Agent, or Firm* — Sterne, Kessler, Goldstein & Fox P.L.L.C.

(57) ABSTRACT

Methods, media and systems for screening content for malicious content in a web browser are disclosed. Document object model (DOM) elements are retrieved from the content displayed in the web browser. A link to visit a web site included in the DOM elements is identified. The identified link is compared to a list of permitted sources. Information is scanned to determine whether the information matches records of content transmitted by a primary source among the permitted sources. An alert is generated after determining a mismatch between the information in the DOM elements and records of content transmitted by the primary source.

16 Claims, 5 Drawing Sheets

METHODS, MEDIA, AND SYSTEMS FOR SCREENING MALICIOUS CONTENT FROM A WEB BROWSER

BACKGROUND

The attempts by bad actors to compromise email accounts and computer systems have not abated, despite the numerous efforts by software developers to prevent attacks. One of the most common ways hackers accomplish this is through a "phishing" attack, where an email from a seemingly legitimate source includes a link to a site that is used to compromise the email account or computing system. While browsers and cybersecurity systems have become more adept at detecting these attacks to screen for them (e.g., built-in spam filters, third-party security software, etc.), hackers and criminals use more and more sophisticated means at avoiding security measures.

Blacklists are one method used by developers to prevent hackers from launching such attacks. This method employs lists of sites (or sites with certain characteristics) to block access from known bad actors. Examples include blocking all emails originating with a certain domain name included, e.g., any email address with the handle "@hacker.com", such that emails from john.doe@hacker.com are blocked. Likewise, blacklists can use even broader strokes, blocking messages from particular countries, with selected words in the domain, or having certain handle structures. Working similarly but in reverse, whitelists allow specific addresses through, from those with particular characteristics down to individual email addresses of known safe contacts.

One of the greatest challenges in screening for malicious content are the subtle methods hackers use in avoiding measures such as blacklists or taking advantage of whitelists. As an example, a screening tool could use an amount of the email address that should match to determine if it should be allowed or blocked, e.g., 90% of the address. In this example, if *@socialnetwork.com is allowed by a whitelist (i.e., any email address having the "@socialnetwork.com" handle), then an email address originating from "@socialnettwork.com" might also be allowed, as would an email originating from "@sociallnetwork.com" or from dozens of other minor variations. This variation on "spoofing" attacks (where the source is made to look legitimate by falsely using another email address) presents a great challenge.

Such subtle attacks can be particularly problematic for well-known businesses with a visible online presence and extensive email communication with customers, potential customers, or users, such as large retailers, banks, or social networking sites. Users can overlook the minor difference between "customer.service@largeretailer.com" and "customer.service@largeretialer.com", inadvertently allowing the latter to surreptitiously send a link that, when selected, exposes the user to an attack. Another problem arises from the above-noted attempts as often the email needs to be opened in order to determine if the source is truly legitimate, possibly exposing the user and account to other forms of intrusion.

Accordingly, systems, methods and media are needed that overcome some of the difficulties in detecting phishing attempts that avoid conventional blacklisting or whitelisting methods. Detecting phishing attempts that mimic legitimate sites having an extensive reach online or frequent communications with a wide audience are needed, as are methods that help prevent an attack before an email is opened. An ability to detect such attacks before accessing or opening emails is also needed.

BRIEF DESCRIPTION OF THE DRAWINGS

Descriptions are given with reference to the figures included herein. When possible and for clarity, reference numbers are kept consistent from figure to figure. Some of the figures are simplified diagrams, which are not to be interpreted as drawn to scale or spatially limiting for the described embodiments. Where appropriate, the particular perspective or orientation of a figure will be given to increase understanding of the depicted features.

DETAILED DESCRIPTION

Systems, media, and methods for screening for malicious content in a web browser are described below and in the accompanying figures. By identifying links that are sent in suspicious email messages that do not match original transmission characteristics of the email (such as timestamps, file sizes, or the like), potential spam and intrusion can be avoided. The systems, media and methods can be implemented as a web browser extension providing an effective yet simple solution, also allowing messages to be screened prior to opening or accessing the messages. Alerts can take a variety of forms allowing for different platforms to operate most effectively as browsers are embedded in a number of delivery streams (e.g., alerts may be different in a smartphone or tablet environment than for a desktop computer or laptops, all of which have browsing capabilities).

The following description outlines how document object model (DOM) elements can be used to extend whitelisting capabilities. Once a comparison is made between DOM elements and email log information detailing previous transmissions from an email address associated with the transmitter, a determination can be made as to whether an email containing a link is in fact from the purported source. When emails are not from the source as indicated, users can be alerted in a variety of ways. The browser extension can be dedicated to a particular transmitter, such as a retailer, a financial institution, a social networking platform, a medical provider, a service provider, or an educational institution as examples. Alternatively, the browser extension can be provided by an employer, such as one with a large number of employees, allowing for greater security and trust in internal messaging. In embodiments, the email can be isolated through use of a virtual machine (VM) for some or all of the web browsing extension components.

Figure 1:
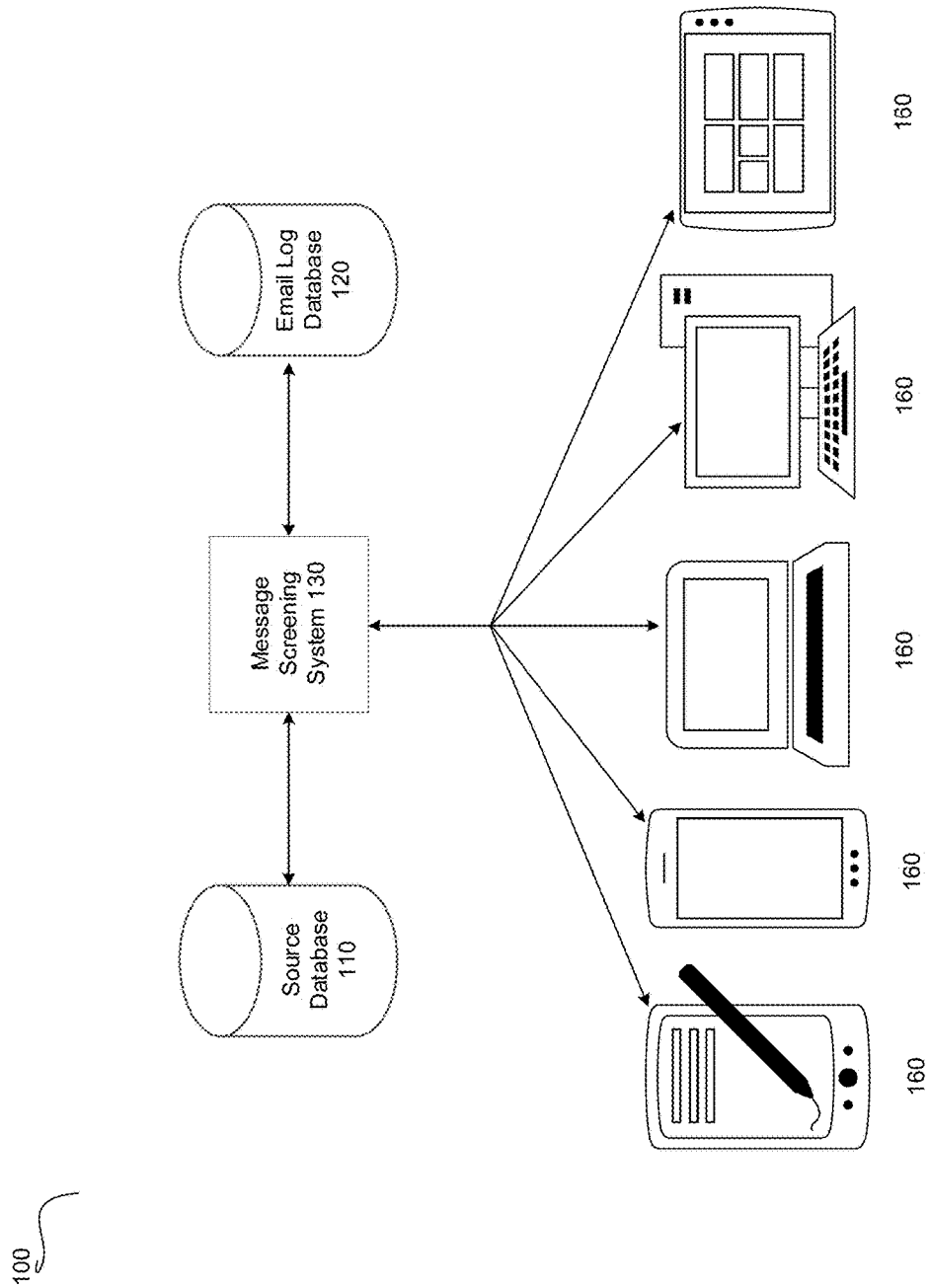
FIG. 1 is an environment for screening malicious content, according to embodiments of the present disclosure.

FIG. 1 is an environment 100 in which malicious content can be screened, according to embodiments of the present disclosure. Environment 100 includes permitted source database(s) 110, email log database(s) 120, and a message screening system 130 in communication with both databases 110 and 120. Environment 100 also includes various user devices 160 in communication with message screening system 130. User devices 160 can be desktop personal computers (PCs), laptop computers, smartphones, tablets, personal data assistants, smart watches, or other electronic devices capable of sending and receiving email messages in a web browser.

Permitted source database 110, email log database 120, and message screening system 130 work in concert to prevent phishing attacks such as the ones described above and below. Permitted source database 110 can contain a list of email sources from which user devices 160 can receive email messages (i.e., a whitelist). Email log database 120 can store records or copies of previously transmitted emails that have been sent out by a particular sender (e.g., a retailer, a bank, a social media site, an educational provider, a medical facility, etc.).

While databases 110 and 120 are shown in FIG. 1 as a single element, one of skill in the relevant art will recognize that more than one database may be used to implement the components of environment 100. In some embodiments, the information contained in database 110 pertinent to a particular user or web browser may be downloaded to a specific device 160. As an example, a specific whitelist for a specified user can be stored locally on a device 160 such as a smartphone. In embodiments, the permitted sources stored in database 110 may be periodically updated. When downloaded to a specific device 160, this may be implemented as periodic push updates. In alternative embodiments, permitted source database 110 and/or email log database 120 may be implemented in a distributed manner or in the cloud.

Message screening system 130 is shown in FIG. 1 as a single element, as well as being separate from devices 160. In embodiments, one or more aspects of message screening system 130 can be downloaded to devices 160. This may include up to all aspects of message screening system 130. In embodiments, at least portions of message screening system 130 can be implemented as a web browser extension. Alternatively, message screening system 130 can be built in as part of the server-end functionality of a web-delivered email system.

In some embodiments, the provider of message screening system 130 can be the same source as the source for emails found in email log database 120 (i.e., the specific retailer, social network, etc.). As an example, a social networking site can offer a browser extension to screen emails users receive from that site. In this example, email log database 120 will include records of transmitted emails from that social networking site, such that emails purporting to be from that site can be screened before being opened in an email or messaging system.

Message screening system 130 can access permitted source database 110 to check whether messages are from a legitimate source, such as one of the examples of sources listed above. Message screening system 130 can then cross-check document object model (DOM) elements from a received email that purports to be from that legitimate source against the logs in email log database 120 to determine whether the message has a match. Using specific information from the logs in database 120, such as the particular source, timestamp and/or file size information, message screening system 130 can verify if the email was in fact sent by the source. If the information does not match when compared, message screening system 130 can generate an alert for the recipient.

For example, an email is received that purports to be from Retailer A, giving information and links about seasonal sale information. Message screening system 130 can access this information in the DOM elements of the received email prior to the user opening the email. Message screening system 130 can then access email log database 120 to see if any message was actually sent from Retailer A at the timestamp included in the message to verify the authenticity of the message. When a DOM element from the email fails to match the original information of the email logs stored in email log database 120, the email can be flagged by message screening system 130.

The matching described above is merely one example and other alternatives are possible. As a further example, matching of the timestamp of messages need not be a precise or identical value, but allows for variations that do not affect the authenticity of the email (e.g., extraordinarily slight variations in the timestamp too small to allow for tampering, time zone differences at the sending and receiving ends, differences explained by in-transit transmission times, etc.). In embodiments, the timestamp may not be examined at all, but rather other elements such as message size or format can be compared. Other examples of modifications within the scope of the present application will also be readily apparent to one of skill in the relevant art.

Figure 2:
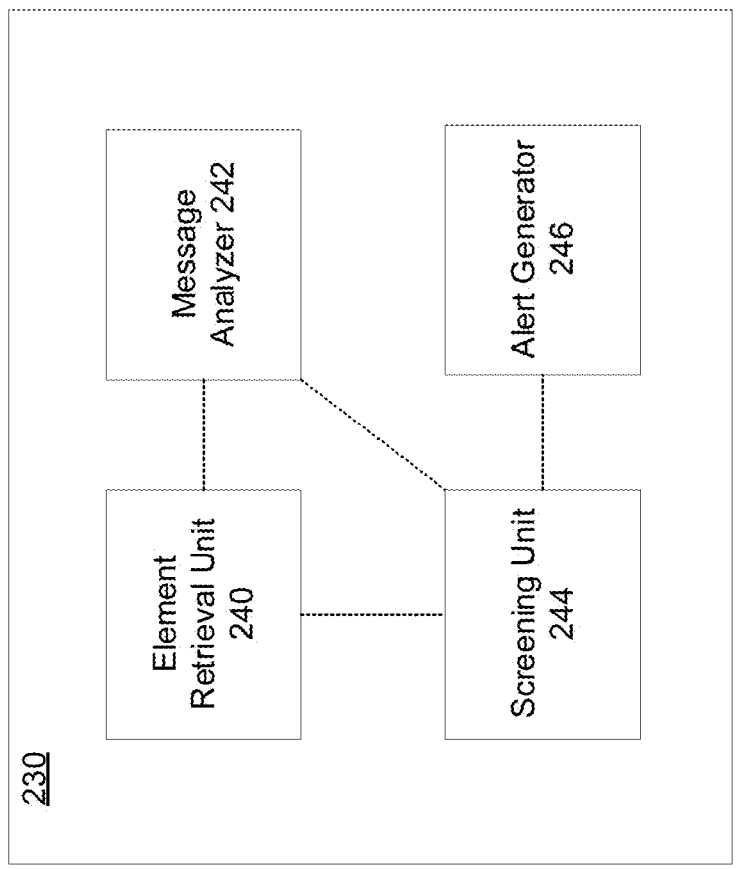
FIG. 2 is a system for screening for malicious content in a web browser, according to embodiments of the present disclosure.

FIG. 2 is a web browser extension 230 for screening for malicious content in a web browser, according to embodiments of the present disclosure. Web browser extension 230 can be the same or substantially similar to message screening system 130 described above with respect to FIG. 1, shown in greater detail. Extension 230 includes, amongst other features, an element retrieval unit 240, which is in communication with both a message analyzer 242 and a screening unit 244. Message analyzer 242 and screening unit 244 are also in communication with one another. Additionally, screening unit 244 is in communication with an alert generator 246.

Element retrieval unit 240 is configured to retrieve DOM elements from an email message displayed in a web browser, such as a web browser found on any of the devices 160 shown in FIG. 1. As described above and below, element retrieval unit 240 can be configured to retrieve the DOM elements before the email message has been selected, accessed, or opened. In this way, email can be determined safe or unsafe without exposing the account to potentially intrusive attacks simply by opening the message to inspect it.

Message analyzer 242 can be configured to identify that a link to visit a web site is included in the DOM elements that element retrieval unit 240 has retrieved. Screening unit 244 can be configured to then compare the identified link by message analyzer 242 to a list of permitted sources (e.g., a list contained in permitted source database 110 as described above in FIG. 1). Screening unit 244 can be further configured to scan information in the DOM elements retrieved by the element retrieval unit to determine whether the information matches records of emails transmitted by a primary source among the permitted sources. As an example, screening unit 244 can compare the information to determine a match against records in a database, such as email log database 120 described above in FIG. 1.

Alert generator 246 can be configured to generate an alert responsive to screening unit locating a mismatch between the information in the DOM elements and records of emails transmitted by the primary source. As an example, alert generator 246 can generate a pop-up message to alert a user of the device to the potential of malicious content in the email message. In embodiments, alert generator 246 can generate alerts such as audio alerts, haptic feedback, written warnings, animated messages, or other types of alerts to draw attention to the malicious content.

Screening unit 244 can be further configured to compare the identified link to a list of prohibited sources (not shown) prior to comparing the identified link to the list of permitted sources. In embodiments, web browser extension 230 can implement element retrieval unit 240, message analyzer 242, screening unit 244 and/or alert generator 246 in a virtual machine configured to prevent sharing of user information or cookies stored by the web browser. Other methods of segregating and isolating the information used by web browser extension 230 to screen malicious content will be apparent to one of skill in the relevant art and within the scope of the present application.

As an example, web browser extension 230 can be a browser extension for a large financial institution (i.e., a retail bank). Because a user is a customer of the bank, the user is accustomed to receiving emails from that source. Using web browser extension 230, all emails purporting to be from the bank can be screened, prior to opening or accessing them. Web browser extension 230 can determine if links are included in an email and if the email matches records generated by the banks transmission log information (e.g., matching information found in a database like email log database 120). When a hacker attempts to send an email that looks like it was generated by the bank, but includes a malicious link, web browser extension 230 can generate a pop-up message notifying a user that the email did not originate from the bank.

While embodiments are described above and below involving web browser extensions, other embodiments falling within the scope of the present application are possible. As an example, an application having access to inbox content can also be used to scan the content of messaging before those emails are accessed. In some embodiments, for example, a user of a messaging account may grant access permissions to enable automated scanning of inbox content without the user having to access the inbox content. In some embodiments, an application may be configured to scan the inbox for messages particular to one or more entities, based on, for example, a recognized sender, or sender domain, keywords relevant to a sender or purported sender, and/or based on a template etc. The application, similar to web browser extension 230 may analyze content of a particular inbox message to determine whether the inbox message did not originate from the purported sender and notify the user. In some embodiments, the application may be a deal-searching application or a price comparison tool that can be leveraged to scan for purported vendor emails and generate notifications prior to a user accessing the inbox. As a specific example, a deal-searching application supplied by a financial institution (that has inbox access) can be used to ensure that emails purportedly from the financial institution with credit or account offers are legitimate.

Figure 3:
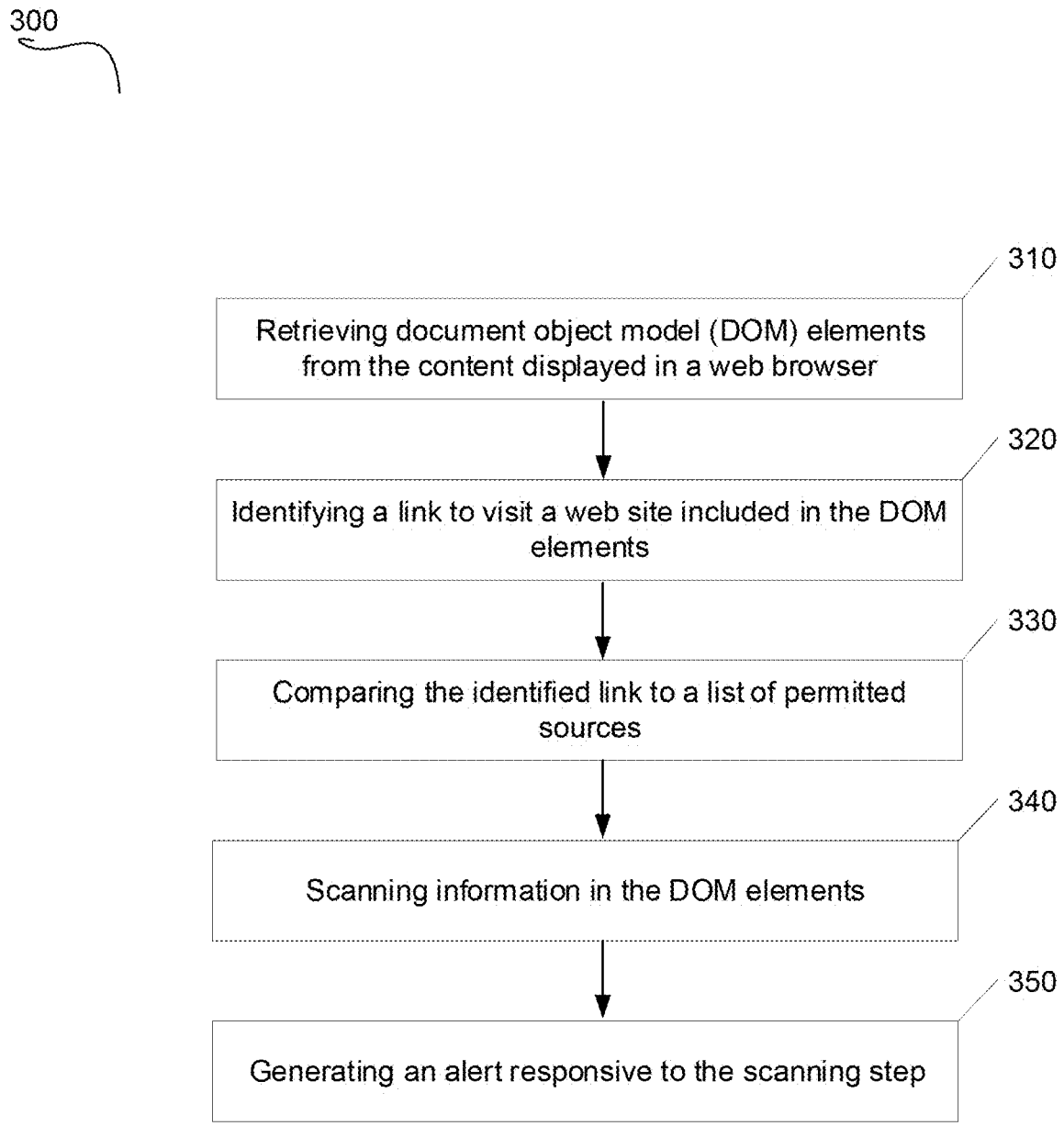
FIG. 3 is a method of screening content for malicious content in a web browser, according to embodiments of the present disclosure.

FIG. 3 represents a method 300 of screening content for malicious content in a web browser, according to embodiments of the present disclosure. Method 300 can be performed using a web browser extension, such as web browser extension 230 described above and can be performed in real-time upon receipt of email communications, for example. Embodiments of method 300 can use other elements, such as those found in environment 100 described with respect to FIG. 1.

At a step 310, document object model (DOM) elements are retrieved from the content displayed in the web browser. For example, DOM elements can be retrieved before the content has been selected, accessed, or opened. At a step 320, a link to visit a web site, included in the DOM elements, is identified.

At a step 330, the link identified in step 320 is compared to a list of permitted sources, i.e., a whitelist. As an example, the list of permitted sources used in step 330 can be the same or substantially similar to information contained in permitted source database 110. In embodiments, the comparison is calibrated to determine if there is an exact match. Alternatively, the comparison requires only partial matching to the whitelist above a predetermined threshold (e.g., a 90% string match).

At a step 340, information in the DOM elements are scanned to determine whether the information matches records of content transmitted by a primary source among the permitted sources. As an example, the primary source can be an online retailer and a known email address at the source, such as "order.fulfillment@ ubiquitousretailer.com". Further to this example, email logs for the address can be compared to see if an email was sent to the email address for which the screening is being performed.

At a step 350, an alert can be generated responsive to the scanning step 340 determining a mismatch between the information in the DOM elements and records of content transmitted by the primary source. For instance, if the timestamp information or file size for an email fails to match records in an email log database (e.g., database 120 in FIG. 1), screening method 300 can determine a legitimate email has been re-purposed from a different source. This can overcome even sophisticated levels of spoofing or spoofing-like attacks. The alert generated can be in an audio, video, written, animated, haptic or other form to direct the user's attention to the potential problem.

Method 300 can further include accessing the email message in a virtual machine. In other words, method 300 can execute the retrieving, determining, comparing, scanning, and/or generating in the VM. When method 300 uses a virtual machine to perform screening functions, the method can further include transmitting any generated alert from the VM to the web browser. Method 300 can be performed in such a manner as to prevent sharing of user information or cookies stored by the web browser through such isolation. Method 300 can further include comparing the identified link to a list of prohibited sources prior to comparing the identified link to the list of permitted sources.

In the above example, the web browser extension used in method 300 can be a browser extension specific to the primary source, i.e., specific for "Ubiquitous Retailer" based on its large volume of transmitted emails. Providing the web browser extension can permit those who frequently exchange email communications with Ubiquitous Retailer to enjoy a greater degree of confidence that electronic communications with the company have not been electronically tampered with or transmitted by other sources. Simultaneously, the use of method 300 and its associated browser extension renders would-be hackers less effective.

Figure 4:
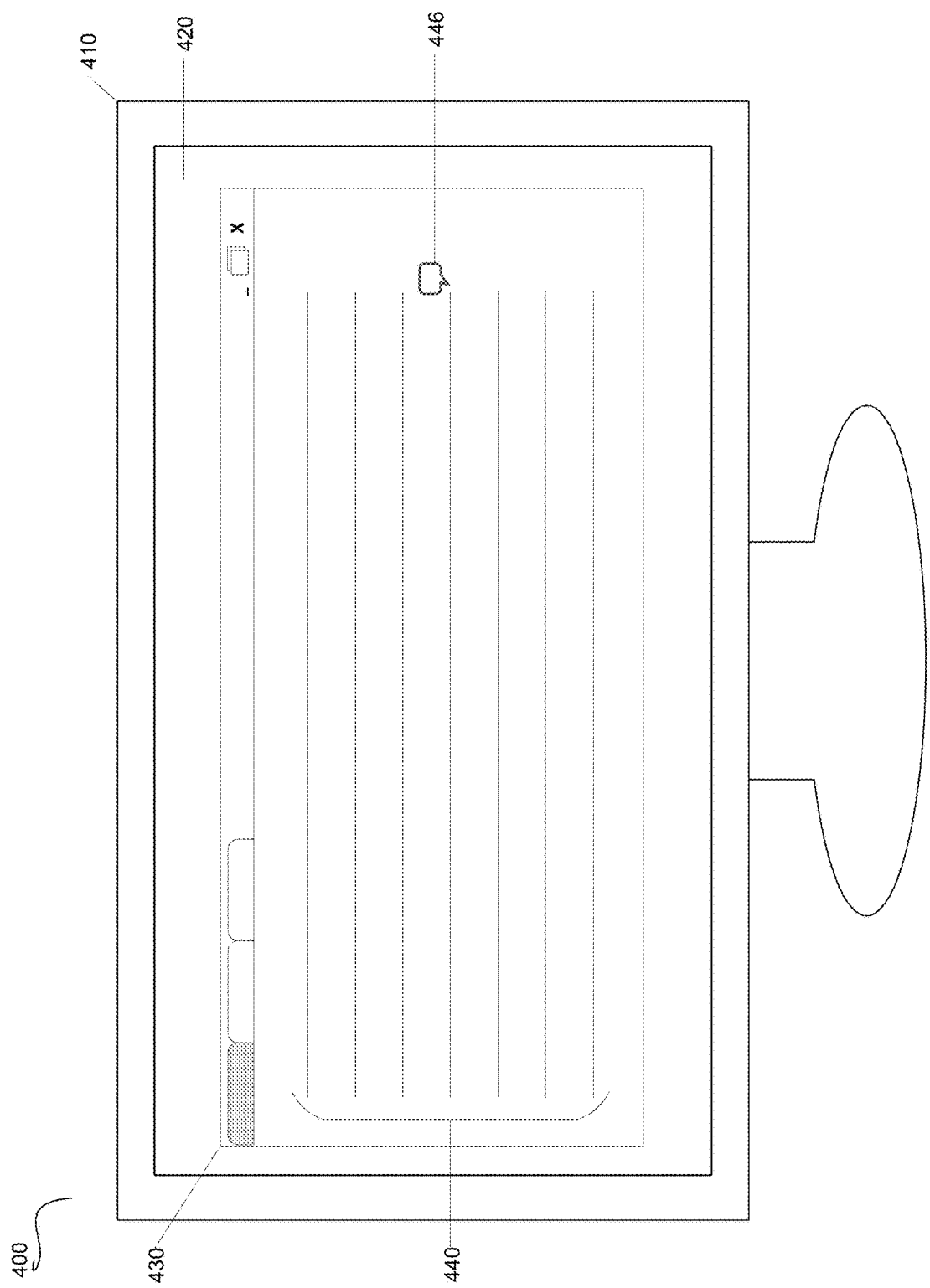
FIG. 4 is an example browser page, according to embodiments of the present disclosure.

FIG. 4 is an example browser display 400, according to embodiments of the present disclosure. Browser display 400 includes a monitor 410 having a display area 420. A browsing session is shown in display area 420, with a browsing tab 430 highlighted as an active browsing tab in browser display 400. Within browsing tab 430 are a series of lines representing a set of emails 440 and an alert 446 associated with one of the emails in set 440.

As shown in FIG. 4, alert 446 is associated with a specific email based on the systems and methods described above and below. Of note, the email in set 440 for which alert 446 has been generated has not been opened, accessed or highlighted. Rather, systems such as web browser extension 230 and method 300 described above can generate alert 446 before the email has been opened, accessed or highlighted.

Alert 446 is shown in FIG. 4 as a short, written message. Alert 446 may be presented either in the current browsing tab including set of emails 440, or as a pop-up message constituting its own browsing tab or display level. As an example, alert 446 can be a simple message stating "BigBank didn't send this" if the web browser extension is provided by BigBank. Other phrases, messaging, or presentation can be transmitted as an alert and the above is merely an example.

While shown as a visual cue, alert 446 can take other forms. Alert 446 can be an audio alert or short audio message. In embodiments suitable for a smartphone, tablet or other mobile device, a haptic alert can be used for alert 446, alone or in conjunction with a written message. Alert 446 can be an animation (e.g., gif file) or combination of video, audio and written cues. Other methods of alerting a potential user will be apparent to one of skill in the relevant art.

Figure 5:
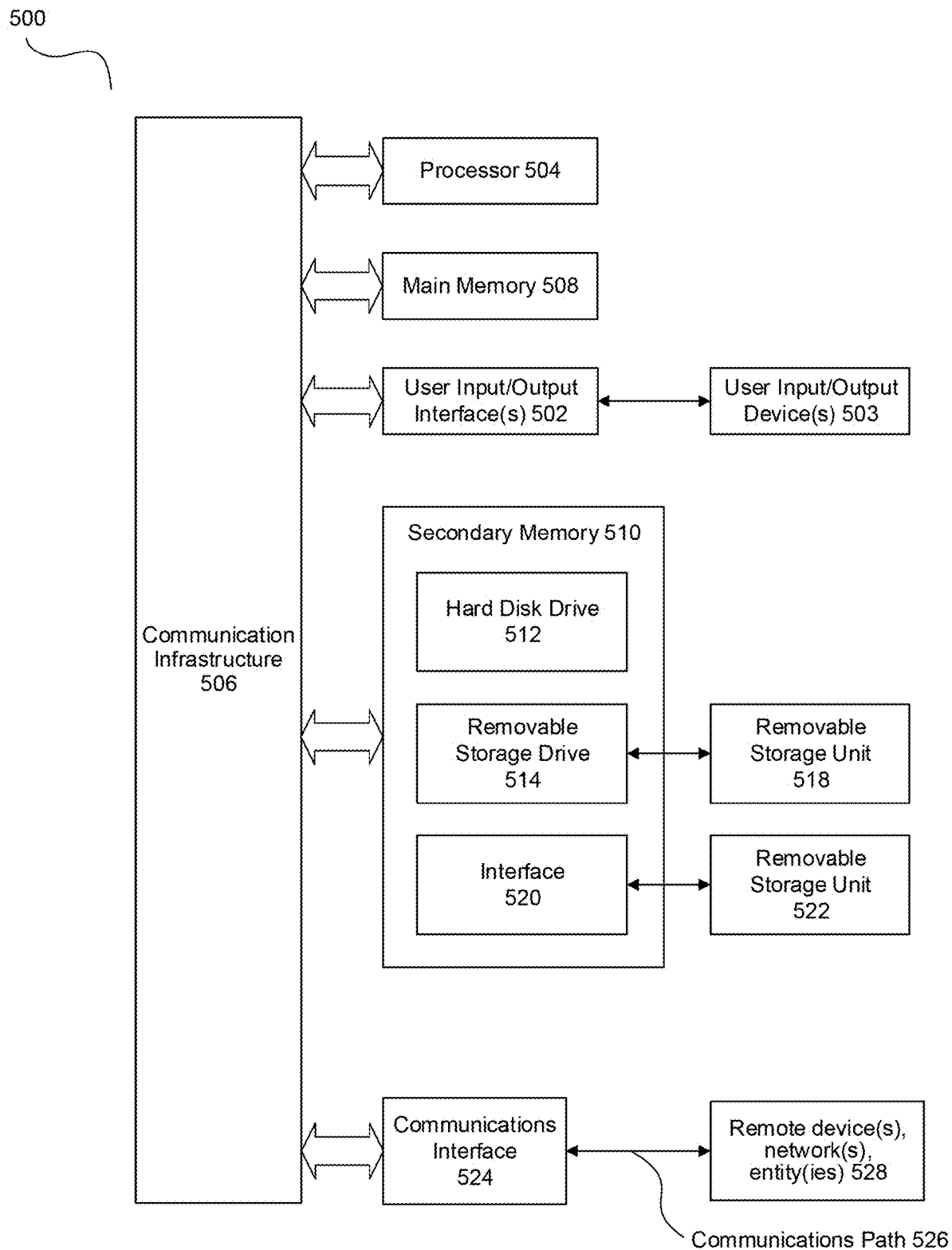
FIG. 5 is a computer system, according to an embodiment of the present disclosure.

FIG. 5 depicts an example computer system useful for implementing various embodiments. Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 406 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data. Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments of the present application as contemplated by the inventor(s), and thus, are not intended to limit the present application and the appended claims in any way.

The present application has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the application that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present application should not be limited by any of the above-described exemplary embodiments, but should be defined only in accordance with the following claims and their equivalents.

What is claimed is:

1. A method of screening content for malicious content in a web browser, the method performed by a web browser extension specific to a primary source, the method comprising:
    retrieving document object model (DOM) elements from content displayed in the web browser;
    identifying a link to a web site included in the DOM elements;
    comparing the identified link to a list of permitted sources that includes the primary source;
    determining, based on the list of permitted sources and a scan of information in the DOM elements, a mismatch between the information in the DOM elements and records of content transmitted by the primary source; and
    generating an alert responsive to the determining the mismatch between the information in the DOM elements and the records of content transmitted by the primary source.

2. The method of claim 1, the retrieving the DOM elements from the content includes retrieving the DOM elements before the content has been selected, accessed, or opened.

3. The method of claim 1, wherein the content is an email message, the method further comprising:
    accessing the email message via a virtual machine.

4. The method of claim 3, further comprising preventing sharing of user information or cookies stored by the web browser.

5. The method of claim 3 further comprising transmitting the alert from the virtual machine to the web browser.

6. The method of claim 1 further comprising comparing the identified link to a list of prohibited sources prior to the comparing the identified link to the list of permitted sources.

7. A system comprising:
    a memory; and
    at least one processor coupled to the memory and configured to implement a web browser extension specific to a primary source to perform operations comprising:
    retrieving document object model (DOM) elements from content displayed in a web browser;
    identifying a link to a web site is included in the DOM elements;
    comparing the identified link from a message analyzer to a list of permitted sources that includes the primary source;
    determining, based on the list of permitted sources and a scan of information in the DOM elements, a mismatch between the information in the DOM elements and records of content transmitted by the primary source; and
    generating an alert responsive to the determining the mismatch between the information in the DOM elements and the records of content transmitted by the primary source.

8. The system of claim 7 wherein the retrieving the DOM elements from the content includes retrieving the DOM elements before the content has been selected, accessed, or opened.

9. The system of claim 7, the operations further comprising comparing the identified link to a list of prohibited sources prior to the comparing the identified link to the list of permitted sources.

10. The system of claim 7, the operations further comprising accessing the content via a virtual machine that prevents sharing of user information or cookies stored by the web browser.

11. A non-transitory computer-readable medium storing instructions that when executed by one or more processors of a device cause the one or more processors to implement a web browser extension specific to a primary source to perform operations comprising:
    retrieving document object model (DOM) elements from content displayed in a web browser;
    identifying a link to a web site included in the DOM elements;
    comparing the identified link to a list of permitted sources that includes the primary source;
    determining, based on the list of permitted sources and a scan of information in the DOM elements, a mismatch between the information in the DOM elements and records of content transmitted by the primary source; and generating an alert responsive to the determining the mismatch between the information in the DOM elements and the records of content transmitted by the primary source.

12. The non-transitory computer-readable medium of claim 11, wherein the retrieving the DOM elements from the content includes retrieving the DOM elements before the content has been selected, accessed, or opened.

13. The non-transitory computer-readable medium of claim 11, wherein the content is an email message, the operations further comprising:

accessing the email message via a virtual machine.

14. The non-transitory computer-readable medium of claim 13 further comprising preventing sharing of user information or cookies stored by the web browser.

15. The non-transitory computer-readable medium of claim 13 further comprising transmitting the alert from the virtual machine to the web browser.

16. The non-transitory computer-readable medium of claim 11 further comprising comparing the identified link to a list of prohibited sources prior to the comparing the identified link to the list of permitted sources.

* * * * *